United States Patent
Kobayashi

(10) Patent No.: US 6,437,688 B1
(45) Date of Patent: Aug. 20, 2002

(54) OBSTRUCTION DETECTION METHOD FOR VEHICLE

(75) Inventor: Sachio Kobayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,201

(22) Filed: Mar. 15, 2000

(30) Foreign Application Priority Data

Mar. 16, 1999 (JP) .......................................... 11-071042
Dec. 13, 1999 (JP) .......................................... 11-353714

(51) Int. Cl.$^7$ ................................................ B60Q 1/00
(52) U.S. Cl. ...................... 340/435; 340/436; 340/902; 340/903; 180/167; 180/169; 701/301
(58) Field of Search ................................ 340/435, 436, 340/902, 903; 701/301; 180/169, 167

(56) References Cited

U.S. PATENT DOCUMENTS

| | | | | |
|---|---|---|---|---|
| 5,162,794 A | * | 11/1992 | Seithe | 340/903 |
| 5,424,726 A | * | 6/1995 | Beymer | 340/902 |
| 5,530,651 A | * | 6/1996 | Uemura et al. | 701/301 |
| 5,629,669 A | * | 5/1997 | Asano et al. | 340/436 |
| 5,889,476 A | * | 3/1999 | Schmitz | 340/903 |

FOREIGN PATENT DOCUMENTS

| | | |
|---|---|---|
| DE | 36 34 302 C2 | 4/1988 |
| DE | 197 15 622 A1 | 10/1998 |
| JP | 5-170008 | 7/1993 |

* cited by examiner

Primary Examiner—Julie Lieu
(74) Attorney, Agent, or Firm—Arent Fox Kintner Plotkin & Kahn

(57) ABSTRACT

In an electric vehicles sharing system, a number of (electric) vehicles are stored in ports and are used by drivers to achieve assigned objects. Herein, multiple vehicles run together in column in an automatic follow-up manner in such a way that following vehicles which are normally unmanned automatically follow up with a manned preceding vehicle. Each vehicle is equipped with ultrasonic sensors, which are arranged in a front portion and a rear portion respectively. Normally, each vehicle detects a travel direction thereof (i.e., a forward or backward direction) to activate only a sensor which matches with the travel direction. Thus, ultrasonic waves radiated from the ultrasonic sensors do not mutually interfere with each other among the vehicles. If a vehicle detects an obstruction being located within a deceleration decision range by the ultrasonic sensor, it is being decelerated while it also transmits a deceleration instruction to other vehicles by radio communication, so that the other vehicles are being decelerated. Thus, it is possible to keep a constant distance between the vehicles which run together in column. If a failure occurs on a sensor of a following vehicle being arranged in the travel direction, the following vehicle transmits failure information to its ahead vehicle which runs ahead of the following vehicle, so that the ahead vehicle automatically activates a sensor which is arranged in a direction reverse to the travel direction. Thus, it is possible to compensate absence of detection due to the failure.

2 Claims, 9 Drawing Sheets

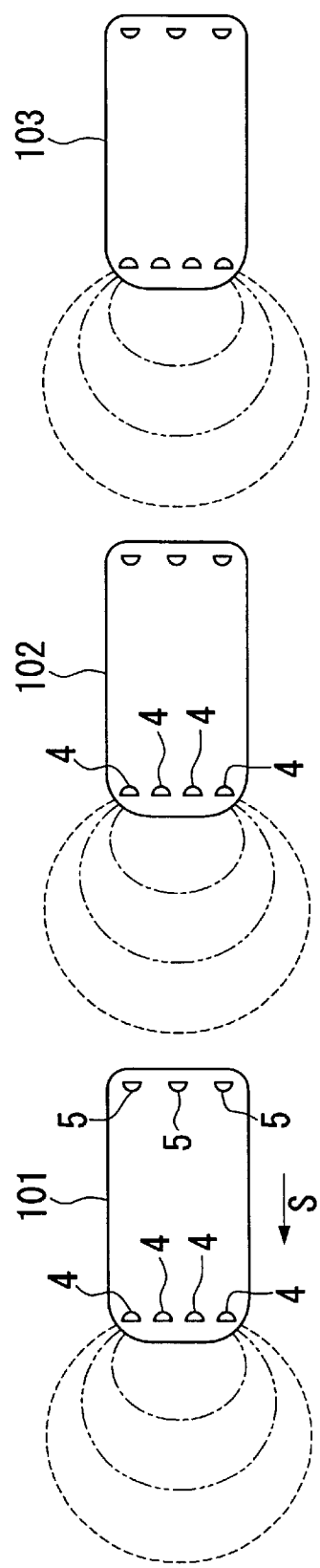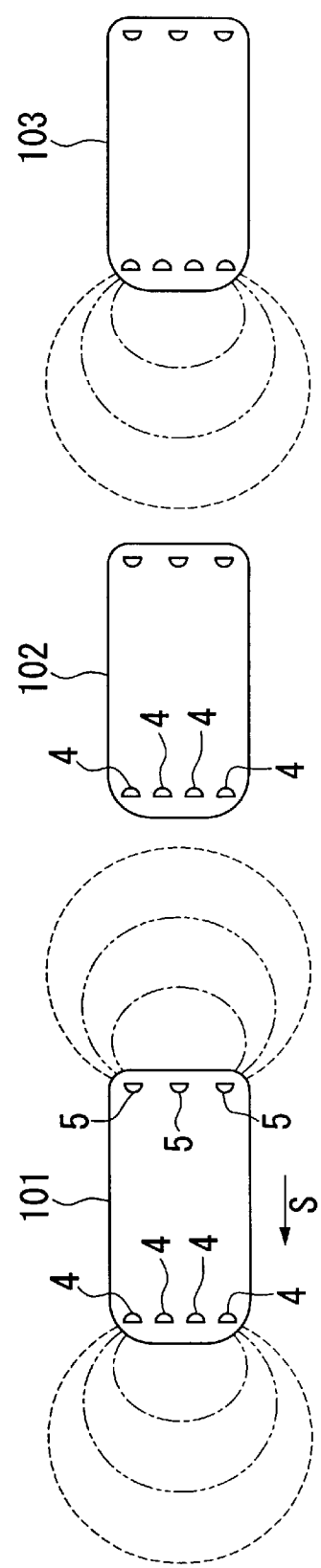

OBSTRUCTION DETECTION METHOD FOR VEHICLE

BACKGROUND OF THE INVENTION

1. Field of the Invention

This invention relates to obstruction detection methods for vehicles which run together in columns under controls of automatic follow-up travel systems. Under the control of the automatic follow-up travel system, two vehicles run together in a column in an automatic follow-up manner that a following vehicle is controlled to follow up with a preceding vehicle, for example.

This application is based on Patent Application No. Hei 11-71042 and Patent Application No. Hei 11-353714 both filed in Japan, the contents of which are incorporated herein by reference.

2. Description of the Related Art

Recent technologies develop automobiles being equipped with obstruction detection alarm (or warning) devices. FIG. 10 shows an example of an obstruction detection device being installed in the automobile. The obstruction detection device of FIG. 10 is mainly constructed by an ultrasonic sensor 201, a detection decision unit 202, a sound alarm device 203 and a display warning device 204. Herein, the ultrasonic sensor 201 is installed in each of a front portion and a rear portion of a vehicle. This ultrasonic sensor 201 measures distance between vehicles and detects obstructions, for example. That is, the ultrasonic sensor 201 radiates ultrasonic pulses to an obstruction. Then, the ultrasonic sensor 201 receives reflected waves corresponding to the ultrasonic pulses reflected by the obstruction. So, it is possible to detect the obstruction by receiving the reflected waves. In addition, it is possible to measure a distance to the obstruction by measuring a time for receiving the reflected waves. Thus, the ultrasonic sensor 201 produces detection signals, which are forwarded to the detection decision unit 202. Based on the detection signals, the detection decision unit 202 activates alarm (or warning) devices such as the sound alarm device 203 and the display warning device 204. That is, when the detection decision unit 202 determines that an obstruction exists in a progressing direction of the vehicle, the sound alarm device 203 generates alarm sounds while the display warning device 204 show warning signs, indications, messages or else. So, a driver of the vehicle is informed of existence of the obstruction by the alarm sounds and warning signs or else.

Automatic follow-up travel systems are proposed for saving driver's loads in driving vehicles. Concretely speaking, unmanned vehicles are led by a manned vehicle with a driver under control of the automatic follow-up travel system. So, it is possible to actualize "driverless" conditions with respect to "following" vehicles which travel to follow up the "manned" preceding vehicle. Techniques for the automatic follow-up travel systems are proposed by a variety of papers and documents such as Japanese Patent Application, First Publication No. Hei 5-170008, for example. An example of the automatic follow-up travel system operates as follows:

A preceding vehicle transmits drive operation values such as a steering value and a throttle opening value to a following vehicle. To follow a same track in travel of the preceding vehicle, the following vehicle performs feed-forward control on a steering value and an engine control value thereof based on differences between the drive operation values of the preceding vehicle and engine outputs thereof. Thus, the following vehicle is capable of following up with the preceding vehicle.

In the aforementioned automatic follow-up travel system, a vehicle which travels independently is equipped with an obstruction detection alarm device. In that case, it is necessary to activate all ultrasonic sensors installed in front and rear portions of the vehicle in consideration of the cost of the device or in consideration of inactivation of switching operations of the sensors which are required when the vehicle changes a travel direction. Now, suppose a situation where a present vehicle adjoins two vehicles in the travel direction thereof in such a way that the present vehicle runs between them. That is, a front-side vehicle runs in front of the present vehicle while a back-side vehicle runs to follow the present vehicle. In such a situation, the present vehicle is placed under influence of ultrasonic waves which are radiated from a back portion of the front-side vehicle, and it is also placed under influence of ultrasonic waves which are radiated from a front portion of the back-side vehicle. Those ultrasonic waves interfere with each other with respect to the present vehicle. As a result, a failure may occur in the obstruction detection alarm device of the present vehicle such that the ultrasonic sensor outputs "error" sensor signals to the detection decision unit. In other words, the ultrasonic sensor installed in the front portion of the back-side vehicle makes an error in detection of an obstruction, which does not actually exist but whose existence is mistakenly detected. Or, it makes an error in detection of an obstruction, which does actually exist but whose existence is not detected. Such an error induces an error operation of the alarm device. In short, the conventional obstruction detection techniques suffer from a problem corresponding to a "low" accuracy in detection of obstructions.

SUMMARY OF THE INVENTION

It is an object of the invention to provide an obstruction detection method for a vehicle, which has a high accuracy in detection of obstructions and which avoids mutual interference of waves radiated from adjoining vehicles in follow-up travels.

This invention is applicable to an electric vehicles sharing system (or automatic follow-up travel system), wherein a number of (electric) vehicles are stored in ports and are used by drivers to achieve assigned objects. Herein, multiple vehicles run together in column in an automatic follow-up manner in such a way that following vehicles which are normally unmanned automatically follow up with a manned preceding vehicle. Each vehicle is equipped with ultrasonic sensors, which are arranged in a front portion and a rear portion respectively and each of which is used to detect an obstruction. Normally, each vehicle detects a travel direction thereof (i.e., a forward or backward direction) to activate only a sensor which matches with the travel direction; Thus, ultrasonic waves radiated from the ultrasonic sensors do not mutually interfere with each other among the vehicles which run together in column. So, it is possible to avoid error detection in which the ultrasonic sensor detects an obstruction which does not actually exit or error detection in which the ultrasonic sensor fails to detect an obstruction which does exit.

In addition, if a vehicle detects an obstruction being located within a deceleration decision range which is determined in advance and which lies in the travel direction by the ultrasonic sensor, it is automatically being decelerated while it also transmits a deceleration instruction to other vehicles by radio communication, so that the other vehicles are automatically being decelerated. Thus, it is possible to keep a constant distance between the vehicles which run together in column.

Further, if a vehicle detects an obstruction being located within a stop decision range which is determined in advance and which is smaller than and included in the deceleration decision range, it is automatically being stopped while it also transmits a stop instruction to other vehicles by radio communication, so that the other vehicles are automatically being stopped. Thus, it is possible to avoid an accident and collision between the vehicles or between the vehicle and obstruction.

Furthermore, if a failure occurs on a sensor of a following vehicle which is activated and is arranged in the travel direction, the following vehicle transmits failure information to its ahead vehicle which runs ahead of the following vehicle, so that the ahead vehicle automatically activates a sensor which is arranged in a direction reverse to the travel direction. Thus, even if a failure occurs on the sensor of the following vehicle in the travel direction, the ahead vehicle activates the sensor to compensate absence of detection due to the failure.

BRIEF DESCRIPTION OF THE DRAWINGS

These and other objects, aspects and embodiment of the present invention will be described in more detail with reference to the following drawing figures, of which:

FIG. 6A is a schematic illustration in plan view showing a relationship between vehicles which travel in column in a follow-up manner by activating only front ultrasonic sensors;

FIG. 6B is a schematic illustration in plan view showing a relationship between vehicles which travel in column in a follow-up manner by activating both of front and rear ultrasonic sensors;

DESCRIPTION OF THE PREFERRED EMBODIMENT

Figure 1:
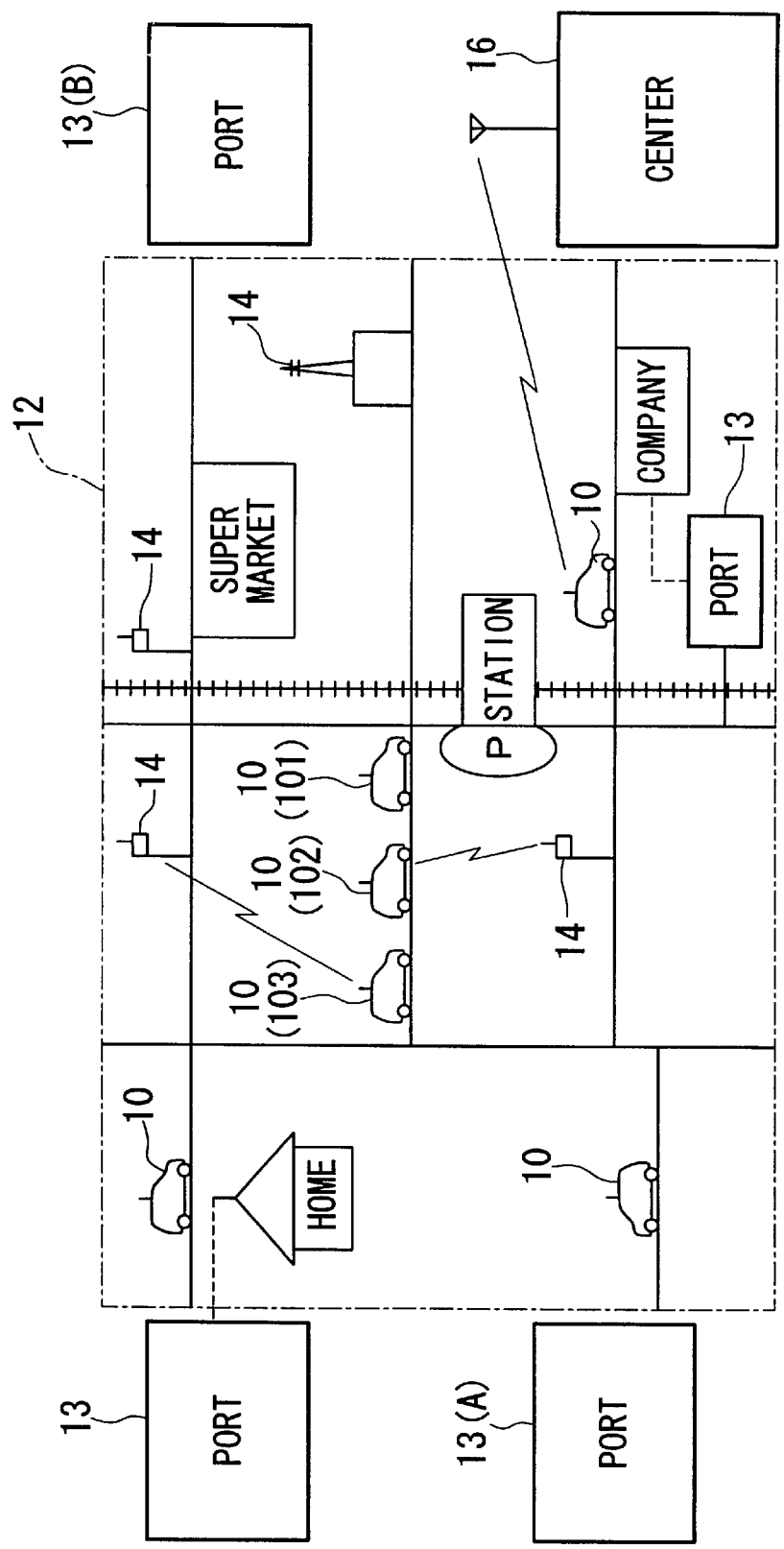
FIG. 1 is a schematic diagram in plan view showing an outline construction of an electric vehicles sharing system employing the preferred embodiment of the invention.

This invention will be described in further detail by way of examples with reference to the accompanying drawings.

An outline construction of an electric vehicles sharing system will be described in accordance with embodiment of the invention with reference to FIG. 1.

The electric vehicles sharing system is constructed such that multiple users share multiple electric vehicles (10) each having same specifications. For example, ports 13 are arranged with respect to utilizable areas of the electric vehicles 10. Each port 13 is capable of storing multiple electric vehicles 10 to park. So, a user (i.e., driver) rents an electric vehicle 10 which is parked in a port 13 located in proximity to home or company. Then, the user drives the electric vehicle 13 to travel on roads to face the oncoming traffic toward a nearest station or super market, wherein the user carries out some desired objects. Thereafter, the user drives the electric vehicle 10 and returns it to a nearest port 13.

Incidentally, multiple communicators 14 are provided to enable communications of information regarding utilized conditions of the electric vehicles 10 in the utilizable area 12. The information is collected and is transmitted to a center 16 of the electric vehicles sharing system by way of the communicators 14. So, the center 16 processes the information.

Figure 2:
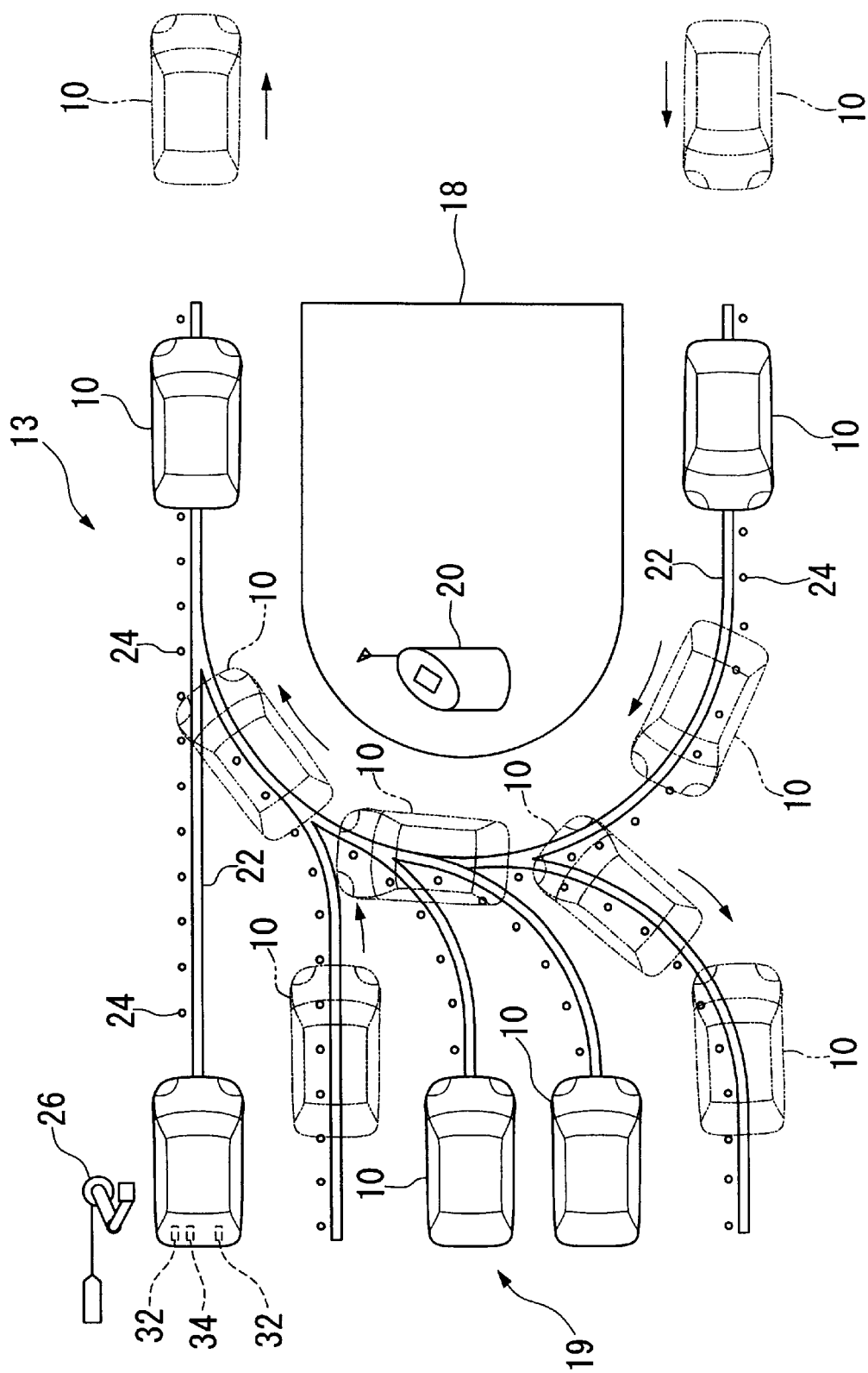
FIG. 2 is a schematic plan view showing a construction of a port for storing electric vehicles.

FIG. 2 shows an example of construction of the port 13. The port 13 has a boarding and alighting place 18 as well as parking places 19. That is, the users rent and return the electric vehicles 10 at the boarding and alighting place 18, while the users park the electric vehicles 10 which are stored in the parking places 19. In addition, a port terminal control device 20 is installed for rent processing and return processing in the boarding and alighting place 18. On the port terminal control device 20, each user uses an IC card recording utilization information to rent and return a desired electric vehicle 10. The port terminal control device 20 manages utilization conditions such as a number of the electric vehicles 10 which exist in the port 13. So, the port terminal control device 20 transmits data regarding the utilization conditions to the center 16 over a public switched network.

Guide cables 22 are buried in lines between the boarding and alighting place 18 and the parking places 19 in each port 13. The guide cables 22 correspond to traffic infrastructure by which the electric vehicles 10 are moved in automatic drive (or unmanned drive). Magnetic nails 24 are buried at selected positions, which are arranged with certain intervals of distance along each guide cable 22. One of the parking places 19 is equipped with an electric charging device 26 which performs charging of electricity to a battery of the electric vehicle 10.

Figure 3:
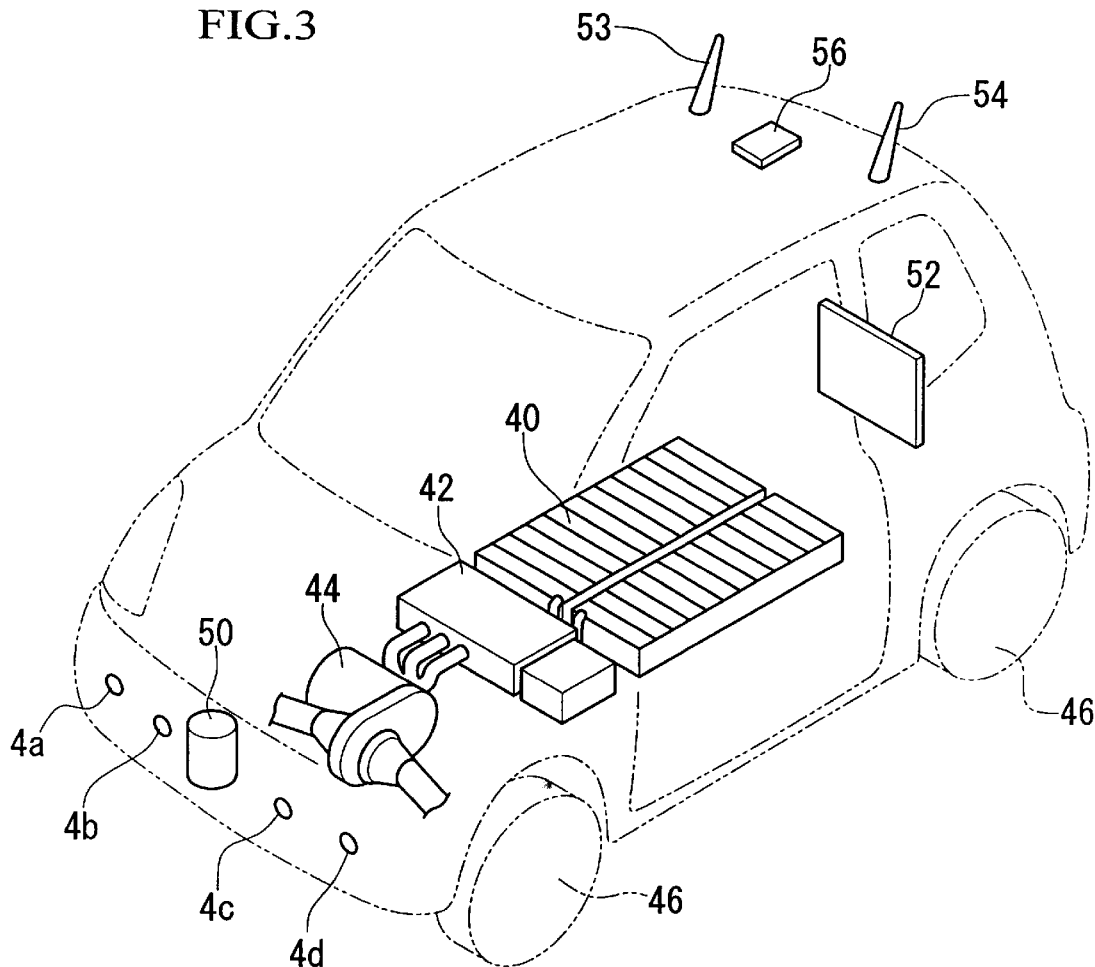
FIG. 3 is a perspective view partly in a transparent manner, showing an outline construction of the electric vehicle.

Each electric vehicle 10 is equipped with guide sensors 32, which are arranged symmetrically with an axis thereof. In addition, it is also equipped with a magnetic sensor 34, which is arranged at a selected position shifted from the axis by an offset value. That is, the magnetic sensor 34 is arranged at a position that faces with the magnetic nails 24 when the electric vehicle 10 travels on the guide cable 22. Further, each electric vehicle 10 is equipped with ultrasonic sensors 4 for collision avoidance in a front bumper and a rear bumper respectively. Incidentally, FIG. 3 shows four ultrasonic sensors 4a, 4b, 4c and 4d, which are arranged in the front bumper of the electric vehicle 10.

For example, the electric vehicle 10 receives an instruction to leave the parking place 19 from the port terminal control device 20 by radio (wireless) communications. In this case, the electric vehicle 10 performs travel feedback control under an automatic drive condition (or unmanned drive condition), as follows:

That is, the electric vehicle 10 determines a travel path based on a map of the port 13. Then, the guide sensors 32 detect magnetic fields (or magnetic fluxes) produced by the guide cable 22, so that the electric vehicle 10 performs positional feedback control in position of width directions thereof while ensuring safety by the ultrasonic sensors 4. In addition, the magnetic sensor 34 sequentially detects the magnetic nails 24, so that the electric vehicle 10 performs "accurate" positional feedback control in the port 13.

In the above-constructed electric vehicles sharing system, when a certain time elapses while utilization of the electric vehicles 10 progress, there occurs an unbalance in concentration of the electric vehicles 10. That is, plenty of electric vehicles concentrate at a certain port, while the electric vehicles do not concentrate at another port so much. Namely, there occurs a concentrated condition or a deconcentrated condition with respect to storage of the electric vehicles in each port. The center 16 grasps and manages those conditions.

Suppose a case in which a concentrated condition of the electric vehicles 10 occurs in a port 13(A) which is drawn in a lower-left portion of FIG. 1, while a deconcentrated condition of the electric vehicles 10 occurs in a port 13(B) which is drawn in an upper-right portion of FIG. 1. In such a case, it is preferable that some of the electric vehicles 10 which are excessive for the port 13(A) are moved to the port 13(B).

To move them, it is possible to use a truck that loads the electric vehicles 10 in the port 13(A). However, it takes some works and time cost to load and unload the electric vehicles 10 on the truck. In addition, it may not be preferable that the truck travels in the utilizable area 12 of the electric vehicles sharing system.

To cope with the aforementioned drawbacks, the present embodiment is designed such that the center 16 uniformalizes (or normalizes) the concentrated condition and deconcentrated condition. That is, the present system is designed to contact with drivers belonging to the center 16 by telephones or else, so that the drivers are instructed to move some electric vehicles 10, which are excessive in the port 13(A), from the port 13(A) to the port 13(B). Herein, the electric vehicles 10 travel in columns from the port 13(A) to the port 13(B).

The aforementioned electric vehicles 10 are subjected to "column" travel (or aligned travel), as follows:

A driver drives a preceding electric vehicle (e.g., 101 in FIG. 1), which is followed by following electric vehicles (e.g., 102, 103 in FIG. 1). Herein, the following electric vehicles are subjected to automatic travel without drivers, or they are subjected to manual travel with drivers. That is, the electric vehicles (e.g., 101–103) travel in column in an automatic follow-up manner. In this case, only two electric vehicles can travel in column, or three or more electric vehicles can travel in column.

The aforementioned column travel is effected using roads in the utilizable area 12. However, no infrastructure such as the foregoing guide cables 22 and magnetic nails 24 is constructed with respect to the above roads. So, the column travel is effected using the roads to face the oncoming traffic, as similar to general-use roads.

FIG. 3 shows an outline construction of the electric vehicle 10. The electric vehicle 10 is constructed to enable manned travel and unmanned travel. Herein, electric power generated by a battery 40 is supplied to a motor 44, which is controlled by means of an ECU (i.e., electronic control unit) 42 for drive control. Accompanied with rotations created by the motor 44, wheels 46 correspondingly rotate so that the electric vehicle 10 is capable of traveling.

As shown in FIG. 3, a laser radar (or radar) 50 that can perform wide-angle scan is installed in a center of a front bumper of the electric vehicle 10. In addition, a reflector 52 is attached to a center of a rear bumper of the electric vehicle 10. The reflector 52 is a plate having a mirror surface, which reflects radar waves radiated from a laser radar attached to a following electric vehicle. Herein, the laser radar of the following electric vehicle captures a reflector of a preceding electric vehicle in position (e.g., laser measuring point) in real time. Thus, it is possible to perform real-time detection on a direction and a position of the preceding electric vehicle (or a distance between the electric vehicles), which is observed from the following electric vehicle. Actually, the present embodiment uses a combination of the laser radar 50 and the reflector 52 to detect a distance between the preceding electric vehicle and following electric vehicle in a progressing direction as well as a positional gap between the preceding electric vehicle and following electric vehicle in a width direction.

As shown in FIG. 3, an intercommunication antenna 53, an external communication antenna 54 and a GPS/DGPS antenna (where "GPS" is an abbreviation for "Global Positioning System", and "D" stands for "Differential") are installed in a roof of the electric vehicle 10. Herein, the intercommunication antenna 53 is provided for radio intercommunication between the electric vehicles, the external communication antenna 54 is provided for radio communication between the electric vehicle and the communicator 14 or center 16, and the GPS/DGPS antenna 56 is provided to receive electric waves and signals from GPS satellites and DGPS stations.

Figure 4:
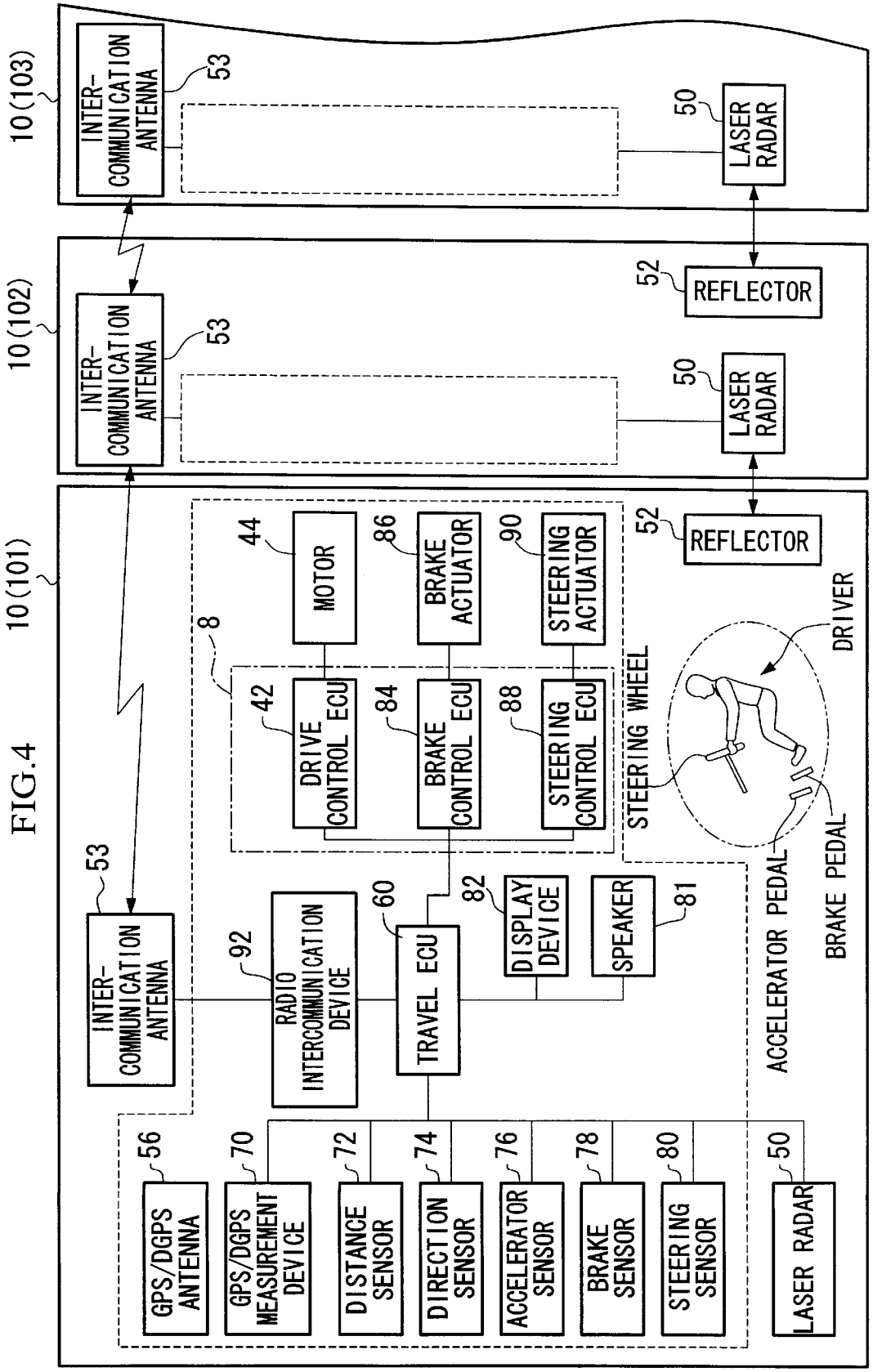
FIG. 4 is a block diagram showing selected parts in internal configurations of vehicles which travel together in column in a follow-up manner.

FIG. 4 shows selected elements in configurations of electric vehicles (10), which are related to the foregoing column travel (or aligned travel). The present embodiment is described in such a way that the column travel is carried out by three electric vehicles 10 (i.e., 101, 102 and 103; see FIG. 1), for example. Herein, a reference numeral 101 designates a preceding electric vehicle which is driven by a driver and runs ahead of other electric vehicles. In addition, reference numerals 102 and 103 designate following electric vehicles, wherein the following electric vehicle 102 runs to follow up with the preceding electric vehicle 101, while the following electric vehicle 103 runs to follow up with the following electric vehicle 102. As described before, all of the electric vehicles 101 to 103 have the same construction and specifications of the foregoing electric vehicle 10. Actually, FIG. 4 shows internal configurations of the electric vehicles 101, 102 and 103. For simplification of illustration, some parts are omitted from the electric vehicles 102, 103. That is, each of the electric vehicles 102, 103 contains a section encompassed by a dotted line, content of which is identical to a part of the electric vehicle 101 encompassed by a dotted line. Using a switch (not shown), it is possible to switch over the electric vehicle 10 in mode between manned drive (corresponding to manual control) and unmanned drive (corresponding to automatic control). That is, an electric vehicle is switched to enable the manned drive as the preceding electric vehicle 101, while electric vehicles are switched to enable the unmanned drive as the following electric vehicles 102, 103.

Each electric vehicle 10 shown in FIG. 4 has a travel ECU 60, which is an overall information processor. The travel ECU 60 is connected with elements 70–80 and the laser radar 50. Namely, a GPS/DGPS measurement device 70 measures a present location of the vehicle in longitude and latitude. A distance sensor 72 detects a travel distance, which is used to calculate a travel speed. A direction sensor 74 detects a progressing direction (or azimuth) of the vehicle. An accelerator sensor 76 detects control torque T (Nm), which is equivalent to a control value of the motor 44 corresponding to accelerator opening. A brake sensor 78 detects brake oil pressure P, which is equivalent to a control value of a brake. A steering sensor 80 detects a steering angle ω (deg), which is equivalent to a control value of a steering wheel.

Incidentally, the GPS/DGPS measurement device 70 has a relatively low accuracy in positional detection, which is 1 m or so. For this reason, this device 70 is not used for travel controls (i.e., feedback control and feedforward control) in the column travel. Instead, the center 16 makes confirmation as to where a column of the vehicles exists in the utilizable area 12. So, the GPS/DGPS measurement device 70 is used for displaying a location of the vehicle on a map being displayed on a screen of a display device 82, which is a part of a navigation device equipped with a speaker 81 for voice guidance.

In response to the control torque T (Nm) detected by the accelerator sensor 76, the travel ECU 60 controls rotations of the motor 44 by means of the drive control ECU 42. In response to the brake oil pressure detected by the brake sensor 78, the travel ECU 60 controls braking force of a brake actuator 86 by means of a brake control ECU 84. In response to the steering angle ω detected by the steering sensor 80, the travel ECU 60 controls a steering actuator 90 by way of a steering control ECU 88.

As replacements of outputs of the accelerator sensor 76 and the brake sensor 78, it is possible to use values, which are produced by effecting integration on outputs of acceleration and deceleration sensors. As replacement of an output of the steering sensor 80, it is possible to use a value which is produced by effecting integration on an output of a yaw rate sensor. As replacement of an output of the distance sensor 72, it is possible to use a value which is produced by effecting integration on an output of a speed sensor. Incidentally, the travel ECU 60 is equivalent to an obstruction detection decision unit, which will be described later. In addition, an automatic vehicle control unit 8 is configured by three ECUs, i.e., the drive control ECU 42, brake control ECU 84 and steering control ECU 88.

Figure 7:
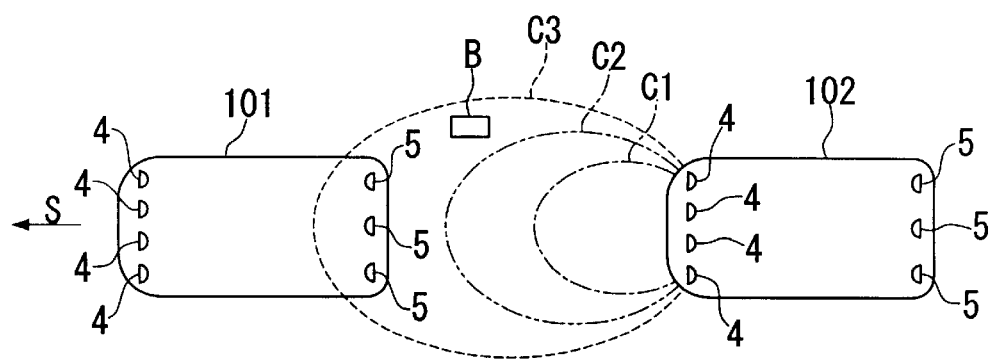
FIG. 7 is a schematic illustration in plan view showing a positional relationship between vehicles in connection with an obstruction and decision ranges.
Figure 5:
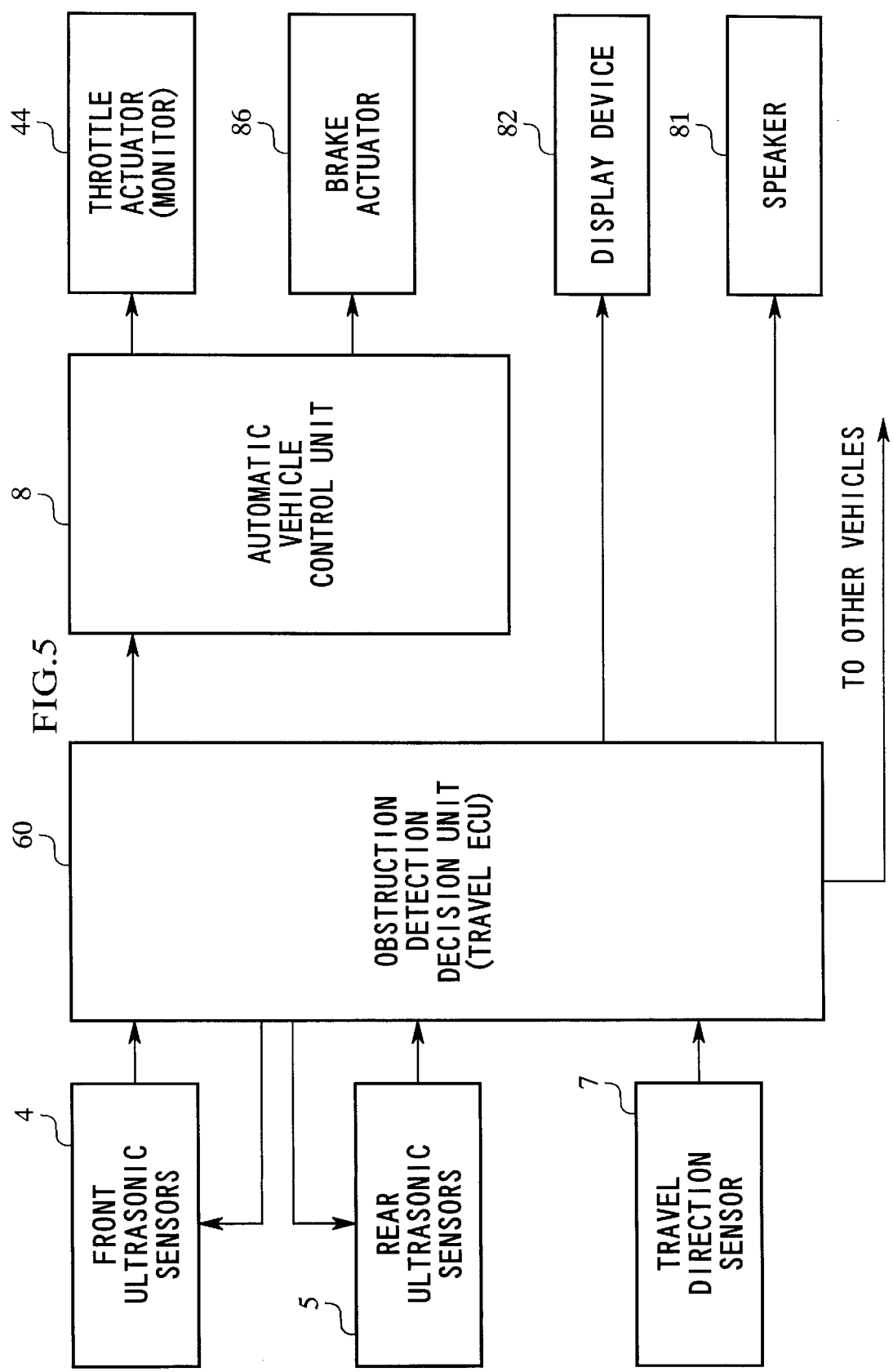
FIG. 5 is a block diagram showing a configuration of an obstruction detection system in accordance with embodiment of the invention.

Next, a description will be given with respect to a obstruction detection system of a vehicle in accordance with embodiment of the invention. FIG. 5 is a block diagram showing a configuration of the obstruction detection system of the vehicle. FIGS. 6A and 6B are schematic illustrations showing conditions for follow-up travels of vehicles. FIG. 7 is a schematic illustration which is used to explain an obstruction detection method using ultrasonic sensors.

In FIGS. 6A, 6B and 7, a reference numeral 101 designates a preceding electric vehicle, which is a manned vehicle driven by a driver. In addition, multiple "unmanned" following electric vehicles (i.e., two following electric vehicles 102, 103) are subjected to automatic follow-up travel to follow up with the "manned" preceding electric vehicle 101. Thus, it is possible to reduce human resources (i.e., drivers) with respect to the following electric vehicles.

Each of the vehicles 101, 102, 103 is equipped with ultrasonic sensors 4 and 5 for detecting obstructions. Herein, four ultrasonic sensors 4 (referred to as "front ultrasonic sensors") are installed in a front portion of the vehicle, while three ultrasonic sensors 5 (referred to as "rear ultrasonic sensors") are installed in a rear portion of the vehicle. Incidentally, "obstruction" gives a general name to a vehicle existing just ahead of a present vehicle, a human, and an object (e.g., a part of a building or construction, a falling matter, etc.) other than the vehicle. In the present embodiment, four ultrasonic sensors 4 are arranged with equal intervals of spacing in the front portion of the vehicle in its width direction. Arrangement and number of the front ultrasonic sensors 4 are not necessarily limited in such a manner, so it is possible to install a single ultrasonic sensor in the front portion of the vehicle. In addition, three ultrasonic sensors 5 are arranged with equal intervals of spacing in the rear portion of the vehicle in its width direction. Arrangement and number of the rear ultrasonic sensors 5 are not necessarily limited in such a manner, so it is possible to install a single ultrasonic sensor in the rear portion of the vehicle. Thus, it is possible to make determination as to whether an obstruction exists in front space of the vehicle or not by using the front ultrasonic sensors 4, and it is possible to make determination as to whether an obstruction exists in back space of the vehicle or not by using the rear ultrasonic sensors 5. In addition, it is possible to measure a distance to the obstruction by using the front ultrasonic sensors 4 or the rear ultrasonic sensors 5. The distance being measured between the vehicle and obstruction is used to maintain a constant distance between vehicles which run together in column, or it is used to stop the vehicle in emergency, for example. Incidentally, the present embodiment employs the ultrasonic sensors as sensors of a self-oscillation-output type (or sensors of an active type) because the ultrasonic sensors have higher frequencies and shorter wavelengths to enable high-resolution measurement. Of course, this invention is not necessarily designed to use the ultrasonic sensors. Instead of the ultrasonic sensors, it is possible to use other sensors such as infrared sensors and millimeter-wave sensors.

In the obstruction detection system of FIG. 5, detection signals (or sensor signals) of the ultrasonic sensors 4, 5 are input to an obstruction detection decision unit 60, which corresponds to the aforementioned travel ECU shown in FIG. 4. Each of the vehicles 101, 102, 103 is equipped with a travel direction sensor 7, which detects a travel direction (i.e., forward or backward direction in travel) of the vehicle. A detection signal of the travel direction sensor 7 is input to the obstruction detection decision unit 60 as well. In each vehicle (i.e., 101, 102 or 103), the obstruction detection decision unit 60 activates only the ultrasonic sensors of a present travel direction on the basis of the detection signal of the travel direction sensor 7. That is, if each vehicle travels in a forward direction (which is designated by an arrow S in FIG. 6A), the front ultrasonic sensors 4 are activated. In contrast, if each vehicle travels in a backward direction (which is reverse to the direction of the arrow S), the rear ultrasonic sensors 5 are activated.

In advance, a deceleration decision range (e.g., thresholds regarding distance) and a stop decision range (e.g., thresholds regarding distance) are preset to the obstruction detection decision unit 60 with respect to detection signals of the ultrasonic sensors 4, 5. Herein, the stop decision range is smaller than and is contained in the deceleration decision range. When the foregoing detection signal (i.e., distance signal indicative of a distance to an obstruction existing ahead of or behind from the vehicle) becomes smaller than a threshold of the deceleration decision range, in other words, when the vehicle detects an obstruction being located within the deceleration decision range, the obstruction detection decision unit 60 outputs a deceleration instruction to an automatic vehicle control unit 8, by which the vehicle is being decelerated. When the detection signal (i.e., distance signal) becomes smaller than a threshold of the stop decision range, in other words, when the vehicle detects an obstruction being located within the stop decision range, the obstruction detection decision unit 60 outputs a stop instruction to the automatic vehicle control unit 8, by which the vehicle is being stopped.

Details of operations regarding deceleration and stop of the vehicle will be described with reference to FIG. 7, wherein the preceding electric vehicle 101 is followed by the following electric vehicle 102. If the following electric vehicle 102 detects the preceding electric vehicle 101 or an obstruction B being located within a deceleration decision range C2, the automatic vehicle control unit 8 of the following electric vehicle 102 controls the motor 44 (or throttle actuator) and the brake actuator 86 so that the vehicle 102 is being decelerated. At the same time, the obstruction detection decision unit 60 of the following electric vehicle 102 transmits a same deceleration instruction to other vehicles by way of the intercommunication antenna 53, which is an intercommunication tool between vehicles. Thus, it is possible to keep a certain distance between the vehicles 101 and 102 as well as between the vehicles 102 and 103. If the following electric vehicle 102 detects the obstruction B or the preceding electric vehicle 102 within a stop decision range C1, the automatic vehicle control unit 8 of the following electric vehicle 102 controls the motor 44 (or throttle actuator) and the brake actuator 86 so that the vehicle 102 is being stopped. At the same time, the obstruction detection decision unit 60 of the following electric vehicle 102 transmits a same stop instruction to other vehicles (i.e., 101, 103) by way of the intercommunication antenna 53. Thus, it is possible to stop the vehicles 101 and 103 as similar to the vehicle 102. Incidentally, if the following electric vehicle 102 detects the obstruction B or the preceding electric vehicle 101 outside of the deceleration decision range C2, it does not perform the aforementioned controls. Incidentally, a reference symbol "C3" designates an obstruction detection range used for detection of an obstruction.

The obstruction detection decision unit 60 makes a decision as to whether each of the ultrasonic sensors 4, 5 operates normally or abnormally (or in failure). When detecting a failure on a front ultrasonic sensor (4) which operates in a forward direction of a present vehicle, the obstruction detection decision unit 60 transmits an instruction to activate a rear ultrasonic sensor (5) of an ahead vehicle which runs ahead of the present vehicle by way of the intercommunication antenna 53. Suppose that a failure occurs on a front ultrasonic sensor (4) of a certain following vehicle (e.g., 102). In that case, an ahead vehicle (e.g., 101) which runs ahead of the following vehicle (e.g., 102) activates a rear ultrasonic sensor (5). Then, a sensor signal of the rear ultrasonic sensor is transmitted to the obstruction detection decision unit 60 of the following vehicle. So, operation values (e.g., throttle opening value and brake operation value) of the following vehicle are controlled based on the sensor signal. Thus, it is possible to keep a certain distance between the ahead vehicle and following vehicle.

The preceding electric vehicle 101 is equipped with a speaker 81 and a display device 82 as alarming tools. When the preceding electric vehicle 101 detects an obstruction being located in a forward direction in travel, the obstruction detection decision unit 60 activates the speaker 81 and the display device 82 to generate alarm sounds and warning signs for a driver. As the alarming tool, it is possible to use one of the speaker 81 and the display device 82.

Next, an obstruction detection method for vehicles will be described by way of two examples.

Figure 8:
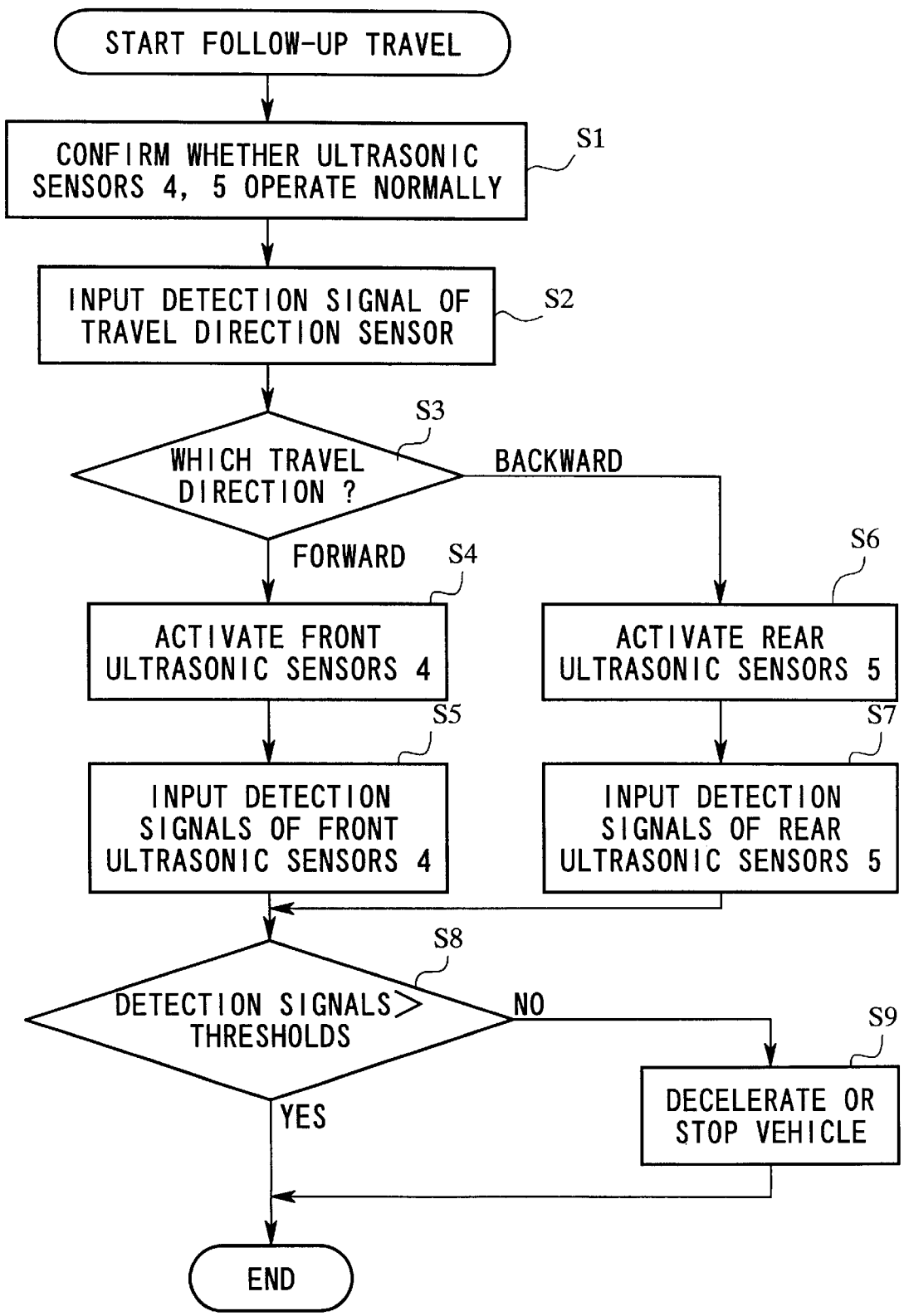
FIG. 8 is a flowchart showing a first example of an obstruction detection method in accordance with this invention.

Now, a first example will be described with reference to FIGS. 5, 6 and 8. When a follow-up travel is started with respect to the vehicles 101, 102 and 103, the obstruction detection decision units (60) of the vehicles 101–103 temporarily activate all the ultrasonic sensors 4, 5 so as to make confirmation as to whether the ultrasonic sensors 4, 5 operate normally or not in step Si shown in FIG. 8. In step S2, the obstruction detection decision unit 60 inputs a detection signal of the travel direction sensor 7. In step S3, the obstruction detection decision unit 60 makes a decision as to whether a travel direction of the vehicle corresponds to a forward direction or a backward direction. If the travel direction corresponds to the forward direction, a program control goes to step S4, wherein the obstruction detection decision unit 60 activates only the front ultrasonic sensors 4 to radiate ultrasonic waves. In step S5, the obstruction detection decision unit 60 inputs sensor signals (i.e., distance signals indicative of distances to an obstruction being located ahead of the vehicle) of the front ultrasonic sensors 4. In contrast, if the travel direction corresponds to the backward direction, a program control goes to step S6, wherein the obstruction detection decision unit 60 activates only the rear ultrasonic sensors 5. In step S7, the obstruction detection decision unit 60 inputs sensor signals (i.e., distance signals indicative of distances to an obstruction being located behind the vehicle) of the rear ultrasonic sensors 5.

For example, in the following electric vehicle 102, its obstruction detection decision unit 60 compares the sensor signals with predetermined thresholds (i.e., distance data) in step S8. If the sensor signals are greater than the thresholds, the obstruction detection decision unit 60 determines that the preceding electric vehicle 101 runs or exits outside of the deceleration decision range C2 (see FIG. 7) of the following electric vehicle 102. So, the automatic vehicle control unit 8 does not change a present throttle opening value and a present brake operation value, so that the following electric vehicle 102 maintains a present traveling condition. If the following electric vehicle 102 detects a part of the preceding electric vehicle 101 being located within the deceleration decision range C2, the automatic vehicle control unit 8 adjusts the throttle actuator 44 and the brake actuator 86, so that the following electric vehicle 102 is being decelerated (see step S9 in FIG. 8). In addition, if the following electric vehicle 102 detects a part of the preceding electric vehicle 101 being located within the stop decision range Cl, the automatic vehicle control unit 8 adjusts the throttle actuator 44 and the brake actuator 86, so that the following electric vehicle 102 is being stopped in step S9. Similar controls of the vehicle 102 are effected on other vehicles 101 and 103 as well.

As described above, the present embodiment is characterized by that each vehicle activates only the ultrasonic sensors being arranged with respect to the travel direction (i.e., forward or backward direction), so it is possible to avoid occurrence of mutual interference of ultrasonic waves between vehicles which run together in a follow-up manner. So, it is possible to eliminate errors in detection of obstructions being detected by the ultrasonic sensors. In other words, it is possible to avoid error detection in which the front ultrasonic sensors detect an obstruction which does not exist ahead of the vehicle, for example. In addition, it is possible to avoid error detection in which the front ultrasonic sensors fail to detect an obstruction which actually exists ahead of the vehicle. As a result, it is possible to perform obstruction detection and evasion with a high accuracy. In addition, it is possible to keep a certain (or constant) distance between vehicles which run together in column in a follow-up manner. So, it is possible to avoid traffic accidents such as collisions between the electric vehicles.

Figure 9:
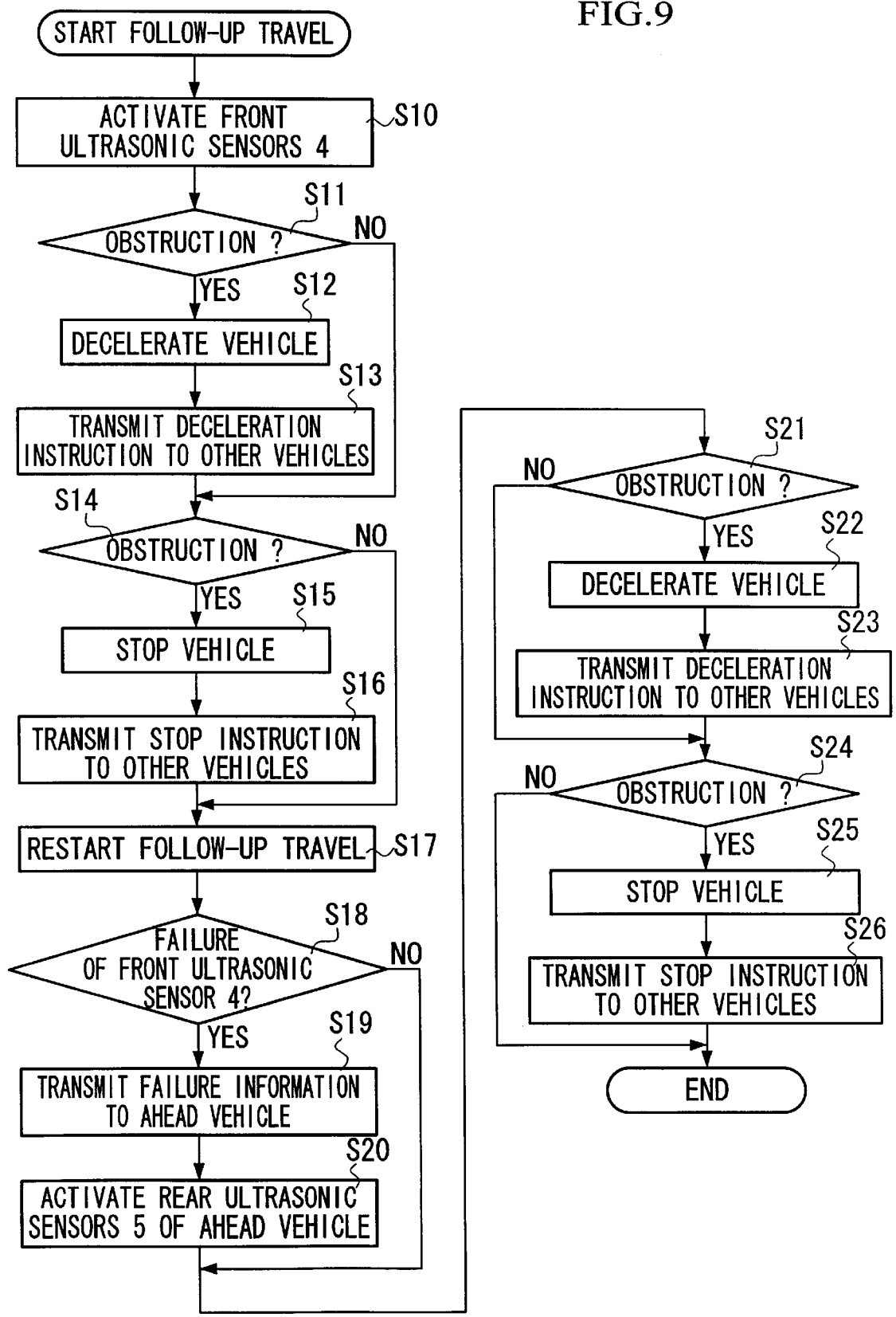
FIG. 9 is a flowchart showing a second example of an obstruction detection method in accordance with this invention.
Figure 10:
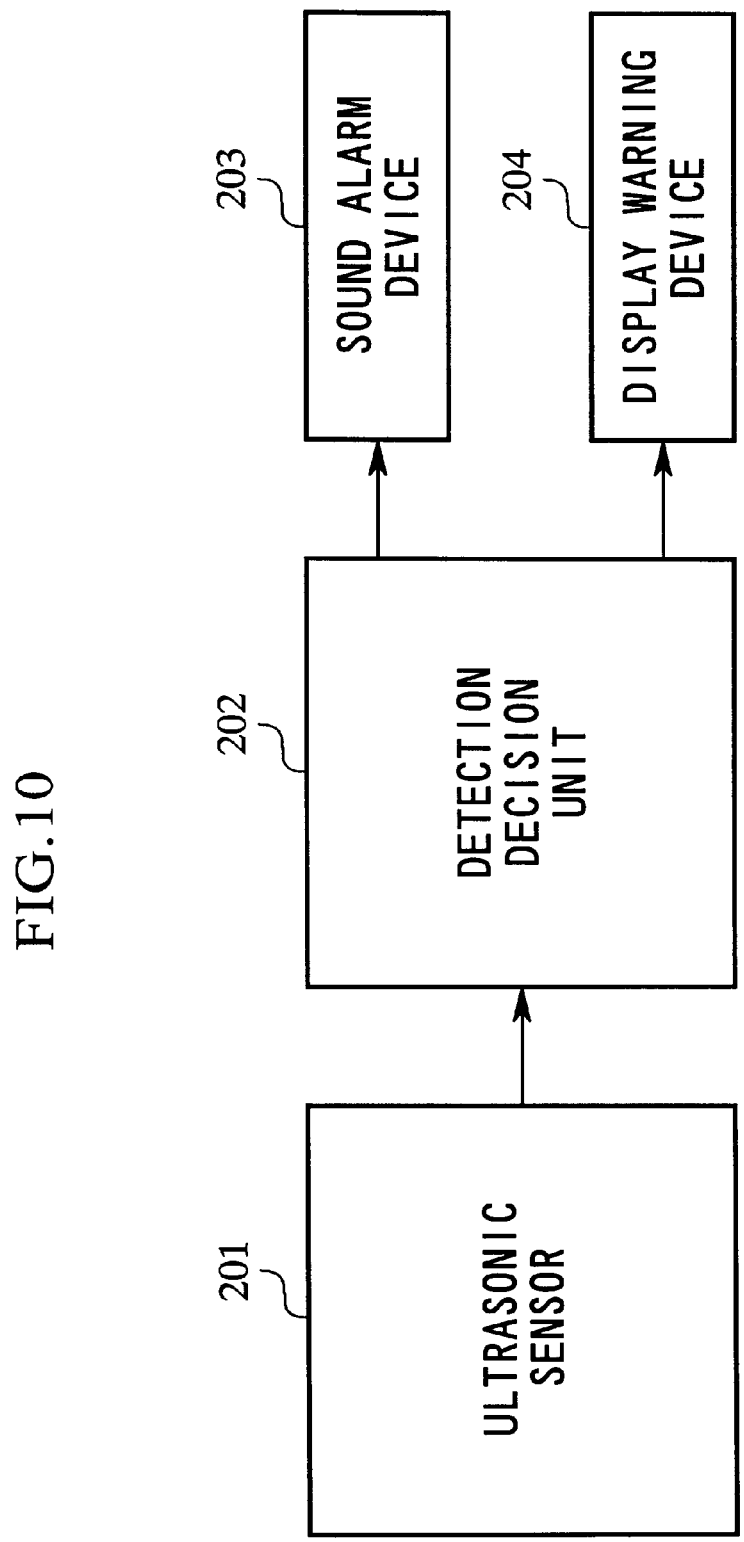
FIG. 10 is a block diagram showing a configuration of an obstruction detection device being conventionally installed in a vehicle.

Next, a second example will be described with reference to FIGS. 5, 6 and 9. During follow-up travel of the vehicles 101–103, their front ultrasonic sensors 4 are activated in step S10 shown in FIG. 9. For example, if the preceding electric vehicle 101 detects an obstruction being located within a deceleration decision range by means of the front ultrasonic sensors 4 in step S11, a program control goes to step S12, wherein the obstruction detection decision unit 60 outputs a deceleration instruction to the automatic vehicle control unit 8 so that the preceding electric vehicle 101 is being decelerated. In step S13, the obstruction detection decision unit 60 of the preceding electric vehicle 101 transmits a same deceleration instruction to other vehicles 102, 103 by way of the intercommunication antenna 53, which is a intercommunication tool between vehicles. Incidentally, if the front ultrasonic sensors 4 of the preceding electric vehicle 101 does not detect an obstruction, the obstruction detection decision unit 60 does not perform the aforementioned controls at all. That is, it skips the steps S12, S13.

For example, if the following electric vehicle 102 detects an obstruction being located within a stop decision range by means of the front ultrasonic sensors 4 in step S14, a program control goes to step S15, wherein the obstruction detection decision unit 60 outputs a stop instruction to the automatic vehicle control unit 8 so that the following electric vehicle 102 is being stopped. In addition, the obstruction detection decision unit 60 of the following electric vehicle 102 transmits a same stop instruction to other vehicles 101 and 103 by way of the intercommunication antenna 53 in step S16. Incidentally, if the front ultrasonic sensors 4 of the following electric vehicle 102 do not detect an obstruction at all, the obstruction detection decision unit 60 does not perform the aforementioned controls. That is, it skips the steps S15, S16.

Then, follow-up control is restarted with respect to the vehicles 101–103 in step S17. In step S18, the obstruction detection decision unit 60 of the following electric vehicle 102 detects a failure on a front ultrasonic sensor 4, for example. In that case, a program control goes to step S19, wherein the obstruction detection decision unit of the following electric vehicle 102 transmits failure information to the obstruction detection decision unit of the preceding electric vehicle 101 which runs ahead of the following electric vehicle 102. In step S20, the obstruction detection decision unit 60 of the preceding electric vehicle 101 activates rear ultrasonic sensors 5. Incidentally, if the following electric vehicle 102 does not detect the failure on the front ultrasonic sensor 4 in step S18, the obstruction detection decision unit 60 does not perform the aforementioned controls. That is, it skips the steps S19, S20. As described above, if a failure occurs on the front ultrasonic sensor of the following vehicle, information regarding such a failure is transmitted to an ahead vehicle which runs ahead of the following vehicle, so that the ahead vehicle activates rear ultrasonic sensors. Thus, it is possible to obtain same effects of the foregoing first example in the second example.

In step S21, the following electric vehicle 103 detects an obstruction being located within a deceleration decision range by means of front ultrasonic sensors 4, for example. In that case, a program control goes to step S22, wherein the obstruction detection decision unit 60 of the following electric vehicle 103 outputs a deceleration instruction to the automatic vehicle control unit 8 so that the following electric vehicle 103 is being decelerated. In addition, the obstruction detection decision unit 60 of the following electric vehicle 103 transmits a same deceleration instruction to other vehicles 101 and 102, which are being decelerated as well in step S23. Incidentally, if the front ultrasonic sensors 4 of the following electric vehicle 103 do not detect an obstruction at all, the obstruction detection decision unit 60 does not perform the aforementioned controls. That is, it skips the steps S22, S23.

In step S24, the preceding electric vehicle 101 detects an obstruction being located within a stop decision range by means of the front ultrasonic sensors 4, for example. In that case, a program control goes to step S25, wherein the obstruction detection decision unit 60 of the preceding electric vehicle 101 outputs a stop instruction to the automatic vehicle control unit 8 so that the preceding electric vehicle 101 is being stopped. In addition, the obstruction detection decision unit 60 transmits a same stop instruction to other vehicles 102, 103 by way of the intercommunication antenna 53 in step S26. Incidentally, if the front ultrasonic sensors 4 of the preceding electric vehicle 101 do not detect an obstruction at all, the obstruction detection decision unit 60 does not perform the aforementioned controls.

The present embodiment is described with respect to automatic follow-up travel in which the vehicles 101–103 travel together in column in such a way that the preceding vehicle 101 are followed up by multiple following vehicles 102, 103. Application of this invention is not limited to such column follow-up travel. This invention is applicable to independent travel in which when a vehicle detects its ahead vehicle, it travels independently to keep a certain (or constant) distance with respect to the ahead vehicle. In that case, the ahead vehicle may corresponds to the preceding vehicle 101.

Lastly, this invention has a variety of technical features and effects, which are summarized as follows:

(1) According to a first aspect of the invention, each vehicle detects a travel direction thereof to activate only a sensor (or sensors) which, matches with the travel direction. Thus, signals and waves being radiated from sensors do not mutually interfere with each other among vehicles, which run together in a follow-up manner. If a sensor signal of the activated sensor (i.e., a distance signal indicative of a distance toward an obstruction) becomes smaller than a threshold of a deceleration decision range (or distance data) which is determined in advance, in other words, if the vehicle detects an obstruction being located within the deceleration decision range, the vehicle is being decelerated automatically. Thus, it is possible to certainly avoid an accident in which the vehicle collides with the obstruction in safety.

(2) According to a second aspect of the invention, when a vehicle detects an obstruction being located within a deceleration decision range by a sensor, it transmits a deceleration instruction to other vehicles, so that the other vehicles are being decelerated. Thus, it is possible to certainly avoid collision between the vehicles. In addition, it is possible to maintain a constant distance between the vehicles with a high accuracy.

(3) According to a third aspect of the invention, if a following vehicle has a failure on a sensor which is arranged in a travel direction, it transmits failure information to an ahead vehicle which runs ahead of the following vehicle. In response to the failure information, the ahead vehicle activates a sensor which is arranged in a direction reverse to the travel direction, as a replacement of the "failure" sensor of the following vehicle. Thus, even if a failure occurs on the sensor of the following vehicle being arranged in the travel direction, it is possible to provide the aforementioned effects of the invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An obstruction detection method applicable to an automatic follow-up travel system in which vehicles including a preceding vehicle and at least one following vehicle run together in column in an automatic follow-up manner and in which each of the vehicles is equipped with sensors for detecting obstructions in a front portion and a rear portion respectively, said obstruction detection method comprising the steps of:

detecting a travel direction in each of the vehicles;
   activating only the sensor which is arranged in the travel direction with respect to each of the vehicles; and
   if the sensor being activated detects an obstruction being located within a deceleration decision range which is determined in advance and which lies in the travel direction with respect to each of the vehicles, automatically decelerating the vehicle whose sensor detects the obstruction within the deceleration decision range; and
   if a failure occurs on the sensor of the following vehicle which is arranged in the travel direction, transmitting failure information from the following vehicle to an ahead vehicle which runs ahead of the following vehicle, so that the ahead vehicle activates a sensor thereof which is arranged in a direction reverse to the travel direction in response to the failure information.

2. An obstruction detection method applicable to an automatic follow-up travel system in which vehicles including a preceding vehicle and at least one following vehicle run together in column in an automatic follow-up manner and in which each of the vehicles is equipped with sensors for detecting obstructions in a front portion and a rear portion respectively, said obstruction detection method comprising the steps of:

detecting a travel direction in each of the vehicles;
   activating only the sensor which is arranged in the travel direction with respect to each of the vehicles; and
   if the sensor being activated detects an obstruction being located within a deceleration decision range which is determined in advance and which lies in the travel direction with respect to each of the vehicles, automatically decelerating the vehicle whose sensor detects the obstruction within the deceleration decision range; and
   if the sensor being activated detects the obstruction being located within the deceleration range, transmitting a deceleration instruction from the vehicle whose sensor detects the obstruction within the deceleration decision range to another vehicle within the vehicles which run together in column in the automatic follow-up manner, so that another is being decelerated in accordance with the deceleration instruction; and
   if a failure occurs on the sensor of the following vehicle which is arranged in the travel direction, transmitting failure information from the following vehicle to an ahead vehicle which runs ahead of the following vehicle, so that the ahead vehicle activates a sensor thereof which is arranged in a direction reverse to the travel direction in response to the failure information.

* * * * *